United States Patent
Klukowski et al.

(10) Patent No.: US 6,340,492 B1
(45) Date of Patent: Jan. 22, 2002

(54) FOOD PRODUCTS SUITABLE FOR FRYING AFTER REHYDRATION AND PROCESS FOR THEIR PRODUCTION

(75) Inventors: Horst Klukowski, Neuenstadt-Kochertürn; Peter Vermeiden, Heilbronn, both of (DE)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/533,708

(22) Filed: Mar. 23, 2000

(51) Int. Cl.⁷ .......................... A21C 11/16; A23P 1/10; A21D 13/00
(52) U.S. Cl. ................ 426/557; 426/560; 426/465; 426/455; 426/496; 426/512
(58) Field of Search ................ 426/557, 465, 426/455, 506, 509, 512, 560, 496

(56) References Cited

U.S. PATENT DOCUMENTS

| | | | |
|---|---|---|---|
| 3,952,115 A | * 4/1976 | Damico et al. | 426/590 |
| RE31,982 E | * 9/1985 | Beck et al. | 426/550 |
| 4,539,214 A | * 9/1985 | Winter et al. | 426/557 |
| 4,810,660 A | 3/1989 | Willard | 426/272 |
| 4,828,856 A | * 5/1989 | Willard | 426/272 |
| 5,700,512 A | * 12/1997 | Desjardins et al. | 426/557 |

FOREIGN PATENT DOCUMENTS

| DE | 196 28 537 A1 | 7/1996 |
|---|---|---|
| FR | 2 534 780 | 10/1982 |

* cited by examiner

*Primary Examiner*—Nina Bhat
(74) *Attorney, Agent, or Firm*—Norris, McLaughlin & Marcus

(57) ABSTRACT

Preformed, rehydratable, dried food products suited for pan frying are prepared in the form of a dimensionally stable composition having a density of at least 0.6 g/cm³. The composition essentially consists of 50–70% by weight grits, 5–25% by weight fat, 5–20% by weight coagulated protein in addition to salt, spices and other optional additives. The products are prepared by mixing the ingredients with a liquid to obtain a wet dough. The dough is portioned into the desired form and subject to thermal treatment at temperatures of 90–160° C. followed by drying to a residual water content of 4–10% by weight.

19 Claims, No Drawings

FOOD PRODUCTS SUITABLE FOR FRYING AFTER REHYDRATION AND PROCESS FOR THEIR PRODUCTION

BACKGROUND OF THE INVENTION

1. Field of the Invention

The invention relates to preformed, rehydratable, dried food products suited for pan-frying and a process for their production.

2. The Related Art

The food products according to the invention are shaped compositions which are prepared to be ready to eat by pan-frying. When prepared fresh, a shapeable dough is produced by mixing and kneading directly from the raw materials to be processed with the addition of a liquid component. For simpler production, portioned dry premixes are on the market in which premixes of all of the raw materials are already present and mixed, to which only a liquid component such as water or liquid egg needs to be further added, but which must then be kneaded to give a shapeable wet dough. There exist preformed food products which are marketed deep-frozen in the raw or already prefried state. Film-packaged polenta slices are known which are marketed in a type of sausage film as a wet dough for further thermal treatment.

It would be more consumer friendly to use preformed, dried food products which, by softening in cold or tepid water, may be rehydrated in a short time without problems and substantially retaining the shape to form a wet dough which can be fried in the pan. A swelling time of 5–15 minutes should be sufficient in this case, and exceeding the recommended swelling time should not lead to any quality impairment.

WO 95/04475 discloses a floating soup garnish and a process for its production, in which a dough is firstly produced from cereals, fat and proteins, this dough is sliced thinly and heated at 80–160° C. under a pressure of 60–150 bar to obtain a product having a thickness of 1.5–5.0 mm and a specific gravity of 150–500 g/l.

In contrast, prototypes of the products according to the invention are semolina slices, polenta slices, falafel, rice products and potato products, but also meat burgers and vegetable burgers, and also those products which are suitable as desserts. These products generally have a thickness of 8–50 mm, preferably 10–30 mm.

DE 196 28 537-A1 discloses products which may be fried, consisting of a mixture of a natural binder e.g. starch, pretreated grains and herbs, which mixture, optionally by addition of water, is formed into the desired shape and fried. The object is to provide a healthy, natural foodstuff which object is mainly solved by the incorporation of the cereal grains. The shaped mixture may be stored or deep-frozen before it is fried. Drying is suggested only when the products are to be consumed as chips or crackers. Drying of such products with subsequent pan-frying would not be possible because such products could not be rehydrated satisfactorily.

FR 2534780-A2 discloses a composition comprising minced meat, semolina and a component rich in proteins, e.g. soya, which composition can be pan-fried to yield hamburgers. Such a composition could not be dried to yield products which could be easily rehydrated.

U.S. Pat. No. 4,810,660 describes the preparation of hash brown potato patties from fresh potato shreds and a dry binder. The dry binder is hydrated and dispersed within the shreds forming an essentially continuous film around the periphery of the patty. This film impedes a simple air-drying of the products and makes their rehydration difficult.

Although it is known from Food Technology (1977) 31(11) 24 ff that textured soy protein improves the quality of freeze-dried beef patties, also their water-uptake after freeze-drying is improved, however with decreasing sensory acceptability.

It is an object of the present invention to provide food products suitable for frying which can be easily dried, preferably by simple air-drying, which can be effectively and quickly rehydrated in cold or tepid water maintaining its form despite of increasing in volume, and not undergoing sensory changes due to processing conditions.

SUMMARY OF THE INVENTION

The preformed, rehydratable, dried products according to the invention essentially consist of a dimensionally stable homogeneous composition of 50–70% by weight, preferably 55–65% by weight, of grits, 5–25% by weight, preferably 10–20% by weight, of fat and 5–20% by weight, preferably 8–15% by weight, of coagulated protein, in addition to salt, spices and other optional additives such as, for example, sugar, egg yolk, maltodextrin etc. They should have a density of at least 0.6 g/cm$^3$ so that during the rehydration in water they do not, at any rate at the start, float on the surface, which would lead to a non-uniform rehydration.

The process according to the invention for the production of the preshaped, rehydratable, dried products is characterized in that the varietally specific raw materials comprising 50–70% by weight, preferably 55–65% by weight, grits, 5–25% by weight, preferably 10–20% by weight, liquefied fat, 5–20% by weight, preferably 8–15% by weight, coagulable protein and a raising agent as well as salt, spices and other optional additives are mixed to form a dry mix, whereafter with addition of a liquid a plastic sliceable wet dough is prepared by mixing and kneading, which wet dough is portioned and converted into the desired form of the products, these dough pieces are, to develop a protein coagulate framework, subjected to a thermal treatment at temperatures of 90–160° C., preferably 100–150° C., for 8–30 minutes, preferably 12–25 minutes and the dough pieces thus treated are then dried to a residual water content of 4–10% by weight, preferably 6–8% by weight. The process conditions should be adapted in such a manner that the dried product has a density of at least 0.6 g/cm$^3$, that is, for example, 0.8–1.2 g/cm$^3$.

DETAILED DESCRIPTION OF THE INVENTION

Firstly, a dry mix is produced from the varietally specific raw materials (such as wheat, maize, chickpeas, beans, dried potatoes and/or bread portions) which are ground to grits or are present in flakes, to which dry mix coagulable protein and animal or hardened vegetable fats are added.

To develop the desired texture a chemical raising agent should be added to the dry mix, for example baking powder, in an effective amount, that is in an order of magnitude of 2–5% by weight based on the dry mix.

The fat is expediently added in liquefied form, more precisely, as far as possible, not until the end after the other components. This achieves a more or less thick fat coating of the other constituents, in particular the grits, as a result of which the swelling behaviour of these constituents can be controlled. Thus the raising agent, for example, can be protected by the fat component until its activation in the thermal treatment.

A chief constituent of the mix is the grits. It is important to use the grits in a suitable particle size. This is generally within a range of 0.1–2.0 mm.

A further essential property of the grits is their swelling behaviour. A reference point taken is the guide swelling value of wheat semolina (untreated), that is to say that the other grit-like raw materials should correspond within a certain range to the cold swelling values of wheat semolina. Advantageously, grits are used which absorb 1–2.5 parts by weight of cold water per part by weight of grits. Particularly preferably, preswollen steamed grits (couscous) are used. When these are used wet, later they only need to be heated slightly and this avoids crack formation due to swelling stabilization.

Via the grain size spectrum of the grits and a more or less thick fat coating, the desired swelling behaviour can be regulated. For grits having relatively high swelling values, a coarser grit grain size must be provided, or the grits must be fat-coated before the dough processing.

For grits having relatively small swelling values, fine-grain granules can also be used, and the fat-treatment of the grits can be reduced. The following reference values generally apply to products customary in trade.

| Raw material | Grain size | Cold swelling | Special features |
|---|---|---|---|
| Durum coarse semolina | 0.250–1.000 mm | 1 Pt/1.3 Pt (water) | native, raw |
| Polenta | 0.100–0.500 mm | 1 Pt/1 Pt (water) | native, raw |
| Potato grits | 0.125–1.000 mm | 1 Pt/2.5 Pt (water) | from blanched dried potatoes, must be highly fatted |
| Chickpeas | 0.125–2.000 mm | 1 Pt/1 Pt (water) | native, raw |
| Couscous | 0.250–2.000 mm | 1 Pt/2 Pt (water) | pregelatinized or intensively fatted |
| Rice grits | 0.250–2.000 mm | 1 Pt/1 Pt (water) | round-grain rice |
| Instant rice grits | 0.125–1.000 mm | 1 Pt/2 Pt (water) | pregelatinized, more intensively fatted |

(Pt = parts by weight)

Suitable grits types are durum coarse semolina, polenta, potato grits, chickpeas, rice grits or pregelatinized instant rice grits.

As coagulable protein, use is preferably made of hen's egg white. However, it is also possible, for example for producing meat burgers, to replace the hen's egg white component wholly or partially by finely divided fresh meat, which is likewise able to coagulate and develop a protein framework.

It has proved to be advantageous to maintain a specific mixing sequence, in which the grits are initially processed to a wet dough with water or milk, to which wet dough the fat and then a dry premix of protein and other constituents are added.

The processing to form the wet dough takes place in the mixer or kneader. Preferably, the dough should be kneaded until the dough sticks together. The processing time for dough preparation to thermal treatment is not to exceed 15 minutes.

The wet dough is converted into the desired form of the products. This shaping of the plastic, sliceable dough composition can expediently take place using a screw extruder with orifice plate and wire cutter or on a shaping roll having a corresponding matrix plate and cutting apparatus. Shaping is to be performed without applying pressure, or applying only very low pressure. The use of an excessive pressure during shaping leads to an impairment of the rehydration capacity. The dough pieces usually have a mass of 10–100, preferably 15–30, g.

Advantageously, the wet dough can be shaped into cylindrical sections of 15–20 mm in height and about 50 mm in diameter, which may be thermally treated particularly expediently. The cylindrical sections can be laid between two film-covered metal plates, Teflon-treated metal plates with space limiters, similar to a waffle iron, or dough pieces dusted with release agent (maltodextrin, lactose, etc.). The metal plates restrict the dough piece in one dimension, but in contrast permit the dough to expand towards the sides during thermal treatment. In cases where the cylindrical sections are restricted at the top and bottom by the metal plates, these plates prevent a convex development of the circular surfaces and also skin formation, which ensures a substantially porous surface which favours drying and the later rehydration. Owing to the expansion, the diameter of the disc grows towards the sides.

In a continuous process the dough pieces advancing on a conveyor belt during their thermal treatment may travel beneath rolls, e.g. 2, 3 or more rollers, restricting the height to which the dough pieces may expand.

The thermal treatment is performed by baking, steaming or by means of microwaves. The thermal treatment must ensure complete coagulation of the protein component, so that a protein framework develops. A thermal treatment at temperatures of 90–160° C., preferably 100–150° C., for 8–30 minutes, preferably 12–25 minutes, is sufficient for this.

The already substantially dimensionally stable dough piece thus formed is then subjected to drying to a residual water content of 4–10, preferably 6–8, % by weight. The drying can be carried out conventionally, preferably by hot air, alternative by vacuum and/or microwaves.

If the thermal treatment has already been performed under microwaves, a subsequent air drying is advantageous.

The dough pieces lose water as soon as during the thermal treatment and can be further dried with minimum expenditure to the residual moisture content required, in particular, for the keeping quality.

It is advisable to carry out pure air-drying according to a suitable temperature-time profile, preferably in a temperature range of 40–80° C., for example for 4 hours at 80° C. or 6 hours at 45° C.

In this manner, a food product having good keeping quality is obtained, which food product can be rehydrated without problem by immersion in cold or tepid water, its shape changing only insignificantly, despite volume expansion due to swelling, and which food product suffers no significant quality losses even if immersion in water is excessive. The rehydrated products can then be fried immediately in the pan.

EXAMPLES

In the examples below, all percentages are by weight/weight.

Example 1

Polenta Slices

Form 100 parts of a dry premix consisting of

| | |
|---|---|
| Maize grits, raw | 67.0% |
| Sunflower seed fat | 16.0% |
| Powdered hen's egg white | 8.5% |
| Sugar | 3.5% |
| Baking powder | 3.0% |
| Common salt | 1.5% |
| Spices | 0.5% |
| Dry premix | 100.0% | by adding 34.0 parts by weight of water, 134.0 parts by weight of wet dough are obtained.

To produce the wet dough, all dry components apart from the fat are premixed and, at the end, the liquefied fat is added under further mixing. The water is added after the dry premix is cooled in a kneader in which the dough is mixed and kneaded at high speed for two minutes.

The dough is shaped to cylindrical sections of 25 g of wet dough having a diameter of 45 mm and a cylindrical height of 15 mm on a mincer having an orifice matrix plate and cutting apparatus.

The dough pieces are mounted between two Teflon-film-coated metal plates having a height restriction of 18 mm and are thermally treated with saturated steam in the steamer for 20 minutes. The height expands from originally 15 mm to the limitation due to the plates of 18 mm and to a diameter of 54 mm.

These disc-shaped dough pieces are then dried on the kiln dryer for four hours at 80° C. (alternatively for 6 hours at 45° C.) to a dry weight of about 20 g, at a residual water content of 6–8%. The dried products have, after drying, a height of about 16 mm and a diameter of about 50 mm. They have a density of about 0.64 g/cm³.

The products can be rehydrated without problem by immersion for 10 minutes in cold water. In this time, the weight increases from 20g to 40g. After the rehydration, the products have a height of 18–20 mm and a diameter of 55–60 mm.

They are fried directly in a fat-coated Teflon pan to give crispy, coherent, sliceable burgers.

Example 2

In a similar manner to Example 1, rice grit slices are produced according to the following formulation:

| | | Mixing sequence |
|---|---|---|
| Instant rice grits | 58.6% | I |
| Powdered hen's egg white | 10.0% | |
| Powdered hen's egg yolk | 5.0% | |
| Common salt | 2.7% | |
| Sodium glutamate | 2.5% | |
| Chemical raising agent | 2.7% including 0.2% ($Na_2H_2P_2O_7$) | IV |
| Hardened vegetable fat | 18.5% liquefied, 60° C. | III |
| Total dry premix | 100.0% | |
| Water | 20.0% | II |

After mixing I and II, and then a resting time of 30 minutes, components III and IV are admixed.

120 parts by weight of wet dough are kneaded and further processed as in Example 1 to yield dried products having a density of 0.81 g/cm³.

Example 3
Wheat Semolina Slices

| | | |
|---|---|---|
| Hard wheat semolina | 60.5% | |
| Powdered hen's egg white | 8.5% | |
| Powdered hen's egg yolk | 4.1% | |
| Common salt | 2.8% | |
| Sodium glutamate | 2.3% | |
| Baking powder | 2.7% | of which 0.2% ($Na_2H_2P_2O_7$) |
| Curcuma swelling starch | 0.1% | |
| Hardened vegetable fat | 19.0% | |
| Total, dry premix | 100.0% | |

100 parts by weight of this dry premix are kneaded with 18 parts by weight of water to give 118 parts by weight of wet dough which is processed as in Example 1 to yield dried products having a density of 0.78 g/cm³.

Example 4
Potato/Vegetable Slices:

| | | Mixing sequence |
|---|---|---|
| Potato grits from dried potatoes | 59.0% | I |
| Powdered hen's egg white | 9.3% | |
| Dry celeriac grits | 4.0% | |
| Skimmed milk powder | 6.3% | |
| Baking powder | 2.7% | IV |
| Common salt | 1.3% | |
| Dried onion grits | 1.0% | |
| Spice mixture | 0.7% (curcuma, pepper, chilli) | cumin, |
| Hardened vegetable fat | 15.7% | III |
| Total dry premix | 100.0% | |
| Water | 31.5% | II |

After mixing I and II, and then a resting time of 30 minutes, components III and IV are admixed. 131,5 parts by weight of wet dough are kneaded and further processed as in Example 1 to yield dried products having a density of 0.84 g/cm³.

Example 5
Falafel

| | |
|---|---|
| Chickpea grits | 67.0% |
| Powdered hen's egg white | 10.0% |
| Wheat flour | 6.0% |
| Hardened vegetable fat | 10.0% |
| Baking powder | 3.0% |
| Salt | 2.0% |
| Spice mixture | 2.0% |
| Dry premix | 100.0% |

100 parts by weight of this dry premix are kneaded with 27 parts by weight of water to give 127 parts by weight of wet dough which is further processed as in Example 1 to yield dried products having a density of 0.66 g/cm³.

What is claimed is:

1. A process for the production of preshaped, rehydratable, dried food products suited for pan-frying comprising premixing 50–70% by weight grits, 5–20% by weight coagulable protein, a raising agent, salt and spices, and then adding 5–25% by weight liquified fat wherein the liquified fat coats at least the grits, adding a liquid and mixing and kneading to prepare a plastic sliceable wet dough, portioning the plastic sliceable wet dough and forming it into a desired shape to make dough pieces, subjecting the dough pieces to a thermal treatment at a temperature from 90–160° C. for 8–30 minutes to develop a protein framework, and the dough pieces thus treated are then dried to a residual water content of 4–10% by weight wherein the dried food product has a density of at least 0.6 g/cm$^3$.

2. The process of claim 1 comprising 55–65% by weight grits, 10–20% by weight liquefied fat and 8–15% by weight coagulable protein.

3. The process of claim 1 further comprising optional additives selected from the group consisting of sugar, egg yolk and maltodextrin.

4. The process of claim 1, wherein the thermally treated dough pieces are dried by air drying at 40–80° C.

5. The process of claim 1 wherein the grits have a particle size in the range of 0.1–2.0 mm.

6. The process of claim 1 wherein the grits absorb 1–2.5 parts by weight of cold water per part by weight of grits.

7. The process of claim 1 wherein the grits are raw or presteamed and the grits are selected from the group consisting of duram coarse grits, polenta, potato grits, chickenpeas, rice grits and regelantinized instant rice grits.

8. The process of claim 1 wherein the fat is a hard vegetable fat.

9. The process of claim 1 wherein the protein is made of hen's egg white.

10. The process of claim 1 wherein plastic sliceable wet dough pieces having a mass of 10–100 grams are prepared.

11. The process of claim 10 wherein plastic sliceable wet dough pieces having a mass of 15–30 grams are prepared.

12. The process of claim 1 wherein the thermal treatment is carried out by baking, steaming or by means of microwaves.

13. The process of claim 1 wherein the thermal treatment is carried out between two metal plates which restrict the dough piece in one dimension.

14. The process of claim 1 wherein in a continuous process the dough pieces travelling on a conveyer belt during their thermal treatment travel beneath rolls which restrict the height to which the dough pieces may expand.

15. The process of claim 1 wherein the product has a thickness of 8–50 mm.

16. Rehydratable dried food products suited for pan-frying having a preformed shape and density of at least 0.6 g/cm$^3$ consisting essentially of a composition of 50–70% by weight of grits, 5–25% by weight of fat and 5–20% by weight of coagulated protein, salt, a raising agent, spices, and optional additives wherein the food product does not significantly change the preformed shape when rehydrated.

17. The products of claim 16 comprising 55–65% by weight grits, 10–20% by weight liquefied fat and 8–15% by weight of coagulated protein.

18. The products of claim 16 wherein the optional additives are selected from the group consisting of sugar, egg yolk and maltodextrin.

19. The products of claim 16 having a thickness of 8–50 mm.

* * * * *